C. W. GRIFFIN.
HARD STOCK CHOPPER.
APPLICATION FILED MAR. 1, 1920.
1,363,778.
Patented Dec. 28, 1920.
2 SHEETS—SHEET 2.
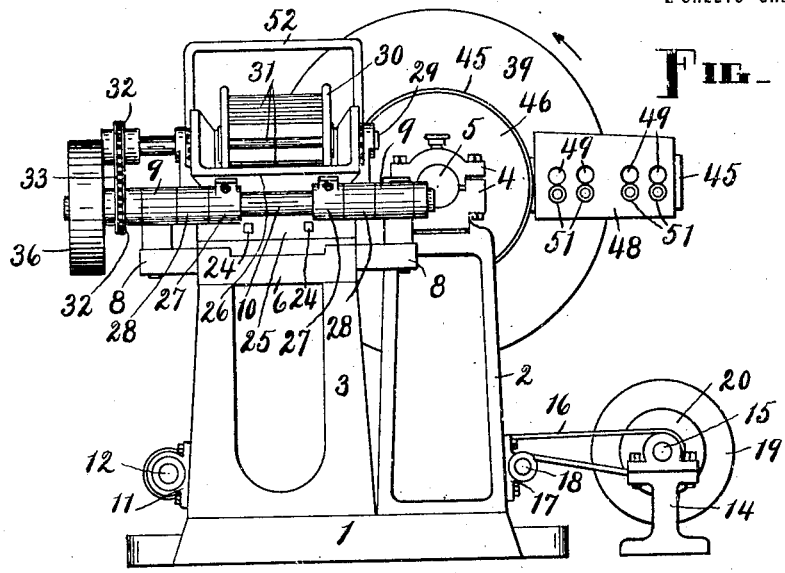
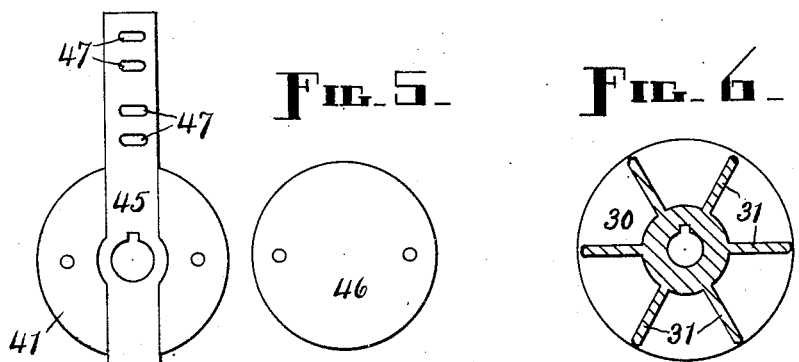
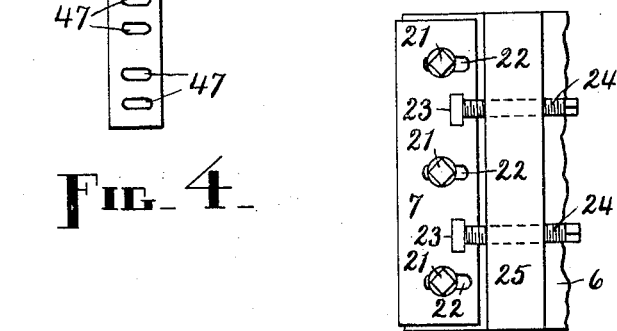
WITNESS:
INVENTOR.
Charles W. Griffin,
BY
Frank A. Cutter,
ATTORNEY.

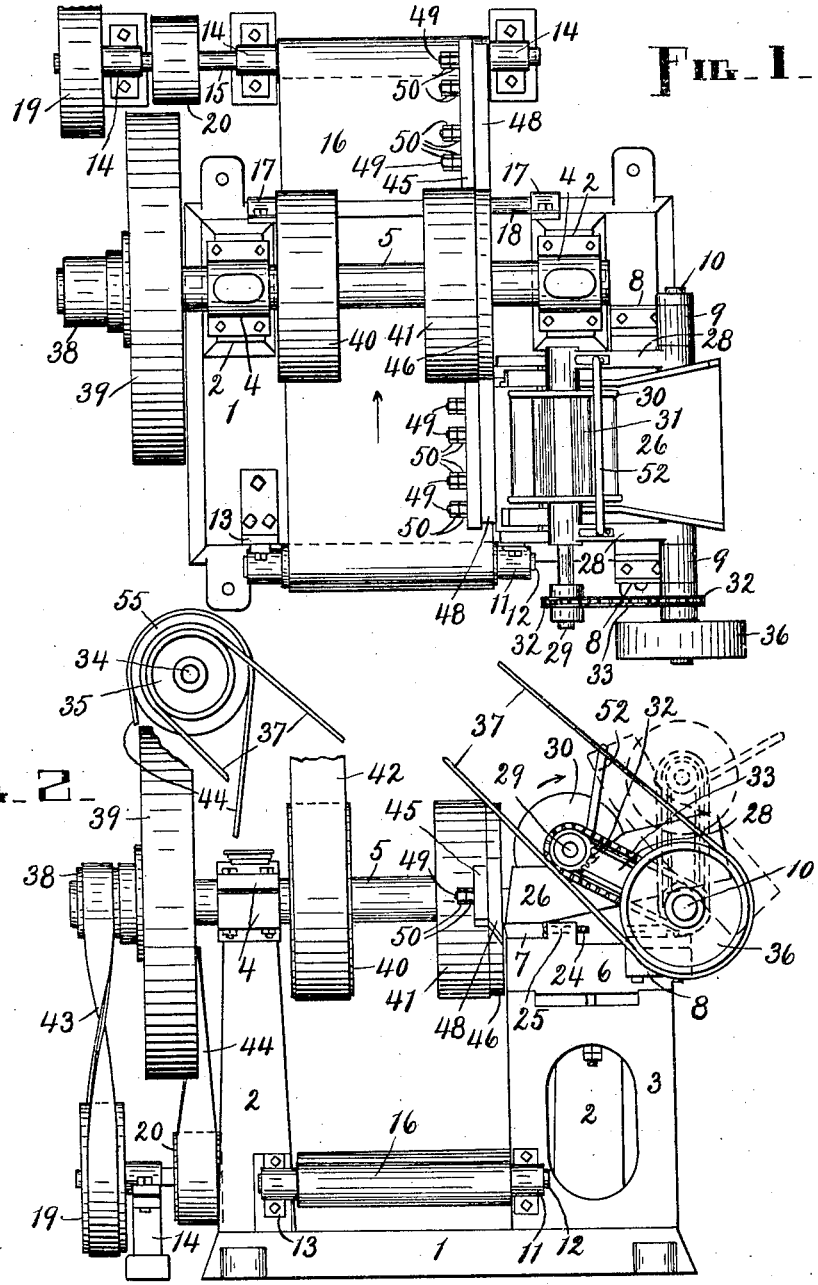

UNITED STATES PATENT OFFICE.

CHARLES W. GRIFFIN, OF RIEGELSVILLE, NEW JERSEY.

HARD-STOCK CHOPPER.

1,363,778.  Specification of Letters Patent.  Patented Dec. 28, 1920.

Application filed March 1, 1920. Serial No. 362,412.

*To all whom it may concern:*

Be it known that I, CHARLES W. GRIFFIN, a citizen of the United States of America, and a resident of Riegelsville, in the county of Warren and State of New Jersey, have invented a new and useful Hard-Stock Chopper, of which the following is a specification.

My invention relates to improvements in machines for cutting hard stock, such as rags, burlap, gunny, rope, jute, hemp, and sisal, into sizes or lengths suitable for the manufacture of pulp for paper, and consists essentially of a bed-knife, and a shear or ax blade or blades with rotary means for carrying such blade or blades in a plane at right-angles to the plane of said bed-knife and in operative relation thereto, together with a feed box and feed roll of special construction, and such other elements as are necessary to complete the machine and render it serviceable and efficient in every respect, the parts and members being arranged and combined in a new and novel manner, all as hereinafter set forth.

This invention is of particular advantage in carrying out the new process of manufacturing pulp for paper, wherein or whereby large pieces or long lengths of hard stock are converted into such pulp, set forth in an application of George L. Bidwell filed on even date herewith.

The primary object of my invention is to produce a machine of the character specified above, with which the hard stock is sheared or chopped into large or long pieces, instead of being cut and even shredded into bits as when the ordinary rag cutter is employed, and a large saving in stock is effected. Much of the stock cut in the ordinary rag cutter is wasted because the frayed ends or edges left and the lint produced by said cutter, and which comprise valuable fiber, are subsequently lost in the dusting machines through which said stock passes after being cut, as high as 8% of the original stock in weight being not infrequently lost at this point. Practically all of this stock that has heretofore been lost is saved by the use of my chopper.

Another object is to provide a chopper wherein the stock in large quantities is fed continuously and evenly and cut to standard length, and this without beating the stock and causing a consequent loss of fiber.

Still another object is to provide a hard-stock chopper with means whereby stock of different lengths can be produced.

A further object is to produce a hard stock chopper which is strong and durable, compact, simple in construction and operation and withal highly efficient.

This machine shears or chops the hard stock with an absolutely clean cut as though the same were produced with a broad ax, alligator shears, or a similar implement or device.

Other objects and advantages will appear in the course of the following description.

I attain the objects and secure the advantages of my invention by the mechanism illustrated in the accompanying drawings, in which—

Figure 1 is a top plan of a hard-stock cutter which embodies a practical form of my invention; Fig. 2, what may be termed a front side elevation of said chopper, the driving belts being shown, with portions of all except one of such belts omitted and broken out in order to economize space, and the feed box and feed roll being shown down in operative position in full lines, and raised in inoperative position by broken lines; Fig. 3, what may be termed a front end elevation of said chopper; Fig. 4, a side elevation of the chopping-blade bar and the member to which the same is secured; Fig. 5, a side elevation of the disk which is attached to said member over the central portion of said bar; Fig. 6, an enlarged cross section through said feed rolls and, Fig. 7, an enlarged top plan of the bed and bed-knife.

Similar reference numerals designate similar parts throughout the several views.

The frame of the chopper consists of a base 1, two uprights 2, one at the front end and the other at the back end of said base, and an upright 3 at said front end and also at the front side of said base. Mounted on the upright 2 are bearings 4—4 in which is journaled a horizontal, main shaft 5; and secured to the top of the upright 3 is a bed 6 for a bed-knife 7. Brackets 8—8 on the upright 3 support a pair of bearings 9 in which is journaled a horizontal shaft 10, the latter being parallel with but forward of the bed-knife 7, and at right-angles to the shaft 5.

Secured to the front side of the upright 3 is a bearing 11 for one end of a horizontal shaft 12, and secured to the base 1 behind or at the left of said bearing is a bearing 13 for the other end of said shaft. Behind the back side of the base 1, on the floor, are three bearing stands 14, in which is journaled a horizontal shaft 15. The shafts 12 and 15 have secured thereto an endless conveyer apron 16. Bearings 17—17 are secured to the sides of the uprights 2 that are adjacent to the shaft 15, and a horizontal, idler roller 18 is journaled in said bearings. The roller 18 serves as a carrier for the under or slack reach of the apron 16. Said apron travels in the direction of the arrow in Fig. 1. Large and small pulleys 19 and 20, respectively, are secured on the shaft 15.

The bed-knife 7 is located with its cutting edge directly above the front edge of the apron 16, and is securely fastened to the bed 6 by means of bolts 21, there being three such bolts in the present case, and said knife having the same number of transverse parallel slots 22 therein to receive said bolts and permit said knife to be adjusted forwardly and rearwardly on said bed—see Fig. 7. The bolts 21 pass through the slots 22 and are tapped into the bed 6 beneath the bed-knife 7. The bed-knife 7 has two T-slots 23 therein, which open through the front, longitudinal edge of said knife, and the cylindrical heads and portions of the shanks of a pair of horizontal, adjusting screws or bolts 24 are in said slots. The bolts 24 are tapped into a raised part 25 of the bed 6, the squared heads of said bolts being in front of said raised part.

Upon loosening the bolts 21 and turning the bolts 24 the bed-knife 7 is adjusted either forwardly or rearwardly, according to the direction in which said bolts 24 are turned. After adjusting the bed-knife by this means and in this manner the bolts 21 are retightened. Adjustment of this character is necessary when the bed-knife is first placed in position, and whenever the same becomes worn. The bolts 24 also assist the bolts 21 in holding the bed-knife rigidly in place after adjustment. Upon entirely removing the bolts 21 the bed-knife can be taken from the bed to be reground, or for any other purpose, and then replaced, or to have a new or freshly-ground knife substituted for the old or dull one.

A feed box 26 has bearings 27—27 fastened to the under side near the forward or outer end thereof, and said bearings are mounted on the shaft 10. When in normal position the feed box 26 rests at the rear or inner end on the bed-knife 7, such end being the discharge end, and said box then having a downward and rearward inclination. It is necessary to swing the discharge end of box 26 up out of the way when it is desired to have access to the bed-knife 7, as for the removal of the same, and for this reason said box is mounted on the shaft 10, through the medium of the bearings 27 which are loose on said shaft. The box 26 is trough-shaped and has a flaring forward-end portion.

Also loosely mounted at their outer ends on the shaft 10, outside of the bearings 27, are two arms 28, and journaled at the inner ends of said arms is a shaft 29 upon which is secured a feed roll 30. The feed roll 30 normally operates in the feed box 26, wherein it is caused to revolve by the means presently to be explained, in the direction of the associated arrow in Fig. 2, to actuate the stock in said box out of the discharge end thereof. Since the arms 28 are loosely mounted on the shaft 10, the roll 30 readily adjusts itself to the size of the stock which it feeds.

As clearly shown in Fig. 6, the feed roll 30 consists of a large spool the axial member of which is comparatively small in diameter, and radial blades 31 extending like the blades of a paddle-wheel from said axial member and between the side members.

The direct driving means for the feed roll 30 consist of sprocket-wheels 32—32 secured to the shafts 10 and 29, and a sprocket-chain 33 connecting said sprocket-wheels. The shaft 10 is driven from a countershaft 34, Fig. 2, a pulley 35 secured on said countershaft, a pulley 36 secured on said shaft 10, and a belt 37 connecting said pulleys.

The feeding mechanism described above affords a continuous feed, and coöperates with other elements, presently to be described, in cutting the stock uniformly to the required length.

The main shaft 5 extends beyond the rear bearing 4, and secured on this portion of said shaft are a small pulley 38 and a balance-wheel 39; and secured on said shaft between the bearings 4 are a large pulley 40 and a disk or carrier 41. The shaft 5 is driven, from a suitable source of power (not shown), by means of the pulley 40, and a belt 42, Fig. 2, applied to said pulley. The conveyer pulley 19 is driven from the pulley 38 on the shaft 5, by means of a cross belt 43. A cross or quarter-turn belt 44, from the pulley 20 on the conveyer shaft 15 to a pulley 55 on the countershaft 34, drives the latter. The drive from the countershaft to the feed-roll shaft 29, by way of the shaft 10, has already been described. It is now seen that all revolving parts and members of the chopper are driven from the main shaft of the machine. The balance-wheel 39 serves the usual purpose.

Let into the front face of the carrier 41 is a bar 45, and placed over said face and contiguous portions of said bar is a cover plate or disk 46, which is bolted to said carrier. The bar 45 in this case projects at both ends beyond the carrier 41, and has a series of transverse slots 47 in both projecting terminal portions. A knife or blade 48 is placed against the front side of each of the aforesaid projecting terminal portions or arms of the bar 45, and rigidly secured thereto by means of bolts 49 and nuts 50. There are two sets or rows of openings in the blades 48, through either of which the bolts 49 may be passed, and then through the slots 47, to receive the nuts 50 on the rear terminals of said bolts. The slots 47 and the double sets of openings (see 51 in Fig. 3) provide for the necessary minor adjustment of the blades 48, and for substantial forward adjustment, in the direction of rotation of the carrier 41 and bar 45, of said blades when worn. The heads of the bolts 49 are necessarily countersunk in the blades 48. The direction of rotation of the shaft 5 and the parts and members carried thereby is indicated by the arrow in Fig. 3. The construction and arrangement of parts are such that, as the blades 48 are carried around with the bar 45, said blades shear past the cutting edge of the bed-knife 7, the action being very clearly shown in Fig. 2. This action shears or chops the stock with a clean stroke and without loss of fiber.

The arms 28 for the feed-roll shaft 29 are equipped on top with a bail or handle 52 to facilitate rocking said arms upwardly whenever it is desired to elevate the feed-roll 30 for any purpose, and for returning said arms again to normal position. In Fig. 2 the feeding members, including the box 26, are represented in elevated positions by broken lines. The arms 28 can be rocked upwardly without tilting upward the feed box. For cleaning, as well as for the purpose of obtaining access to the bed-knife 7, it is desirable not to say necessary that the feeding members be capable of being elevated.

Inasmuch as the operation of the chopper will be very generally understood from the foregoing description, such operation is explained but briefly, as follows:

The machine is set in operation, and the stock is placed in the feed box 26. The revolving feed roll 30 catches or engages the stock and pushes or forces it out over the bed-knife 7, where said stock is sheared or chopped as the slowly moving blades 48 pass successively the cutting edge of said knife. The cut stock now drops down onto the apron 16 and is carried by said apron clear of the chopper, being, in the process hereinbefore mentioned, conveyed to a whipper or to a point where the stock leaves said apron to be received by the feeding element of said whipper. The operation may be continued indefinitely or as long as the stock is continued to be fed to the box 16.

The length to which the stock is to be cut may be varied by any one of several methods, as by changing the ratio of revolutions per minute of the main shaft 5 and the feed-roll 29, which might be done through the medium of the sprocket-wheels 32, or by employing a single chopping blade 48 instead of two. Or both of these methods may be resorted to. It is obvious that the faster the feed-roll is driven the longer will be the stock cut by the cutting elements, and the slower said roll is driven the shorter will be such stock. A large sprocket-wheel on the shaft 10 and a small sprocket-wheel on the shaft 29 will produce the faster motion, and the reverse of that arrangement the slower the motion. The same result may be obtained by making changes in other parts of the driving mechanism. Again it is obvious that a single blade 48 can cut but one-half as fast as two such blades, at a given rate of speed, hence the stock cut by the single blade will be longer than that cut by two blades.

The shape of each blade 48 in cross section or end elevation, including the cutting edge thereof, is clearly shown in Fig. 2. The cutting edge of this ax blade shears past the cutting edge of the bed-knife with the desirable and beneficial result to which particular attention has been directed.

Although this machine is especially adapted for cutting or chopping hard stock, it is not limited to such use, but may be employed for reducing any kind of stock which said machine is adapted to handle successfully.

More or less change in the shape, size, arrangement, and construction of some or all of the parts of this machine may be made without departing from the spirit of my invention or exceeding the scope of what is claimed.

What I claim as my invention, and desire to secure by Letters Patent, is—

1. The combination, in a machine of the class described, with a bed-knife, a feed box, tiltable means to support said box over said knife, and means to feed the stock to the knife from said box, of a shear blade, and revolving means to carry said blade past said bed-knife in a plane at right angles to the knife.

2. The combination, in a machine of the class described, with a bed-knife, a feed box for said knife, a revoluble feed roll, and rocking means to support said roll in said box, of a shear blade, and revolving means to carry said blade past said bed-knife in a plane at right-angles to the knife.

3. The combination, in a machine of the class described, with a bed-knife, a feed box, tiltable means to support said box over said knife, a revoluble feed roll, and rocking means to support said roll in said box, of a shear blade, and revolving means to carry said blade past said bed-knife in a plane which is at right angles to the knife.

4. The combination, in a machine of the class described, with a bed-knife, a shaft, a feed box mounted on said shaft over said knife, and adapted to be tilted upwardly on the shaft and a revoluble feed roll in said box, of a shear blade, and revolving means to carry said blade past said bed-knife in a plane which is at right angles to the knife.

5. The combination, in a machine of the class described, with a bed-knife, a feed box over said knife, a shaft, arms mounted on said shaft and adapted to be rocked upwardly thereon, and a revoluble feed roll supported by said arms in said box, said roll being raised from said box when said arms are rocked upwardly, of a shear blade, and revolving means to carry said blade past said bed-knife in a plane which is at right-angles to the knife.

6. The combination, in a machine of the class described, with a bed-knife, a shaft, a feed box mounted on said shaft over said knife, and adapted to be tilted upwardly on said shaft, arms mounted on said shaft and adapted to be rocked upwardly thereon and a revoluble feed roll supported by said arms in said box, said roll being raised from said box when said arms are rocked upwardly, of a shear blade, and revolving means to carry said blade past said bed-knife in a plane which is at right angles to the knife.

7. The combination, in a machine of the class described, with a bed-knife, a suitably journaled driven shaft, a feed box supported on said shaft and extending over said knife, arms supported on said shaft, a shaft journaled in said arms, means to drive said second-named shaft from said first-named shaft, and a feed roll secured on said second-named shaft and operating in said box, of a shear blade, and revolving means to carry said blade past said bed-knife in a plane which is at right angles to the knife.

8. The combination, in a machine of the class described, with a bed-knife, and means to feed stock to said knife, of a shaft at right-angles to said knife, a slotted carrier secured to said shaft, a bar set in the slot in said carrier and radial to said shaft, means to secure said bar in said slot, and a shear blade secured to said bar in operative relation to said bed-knife.

9. The combination, in a machine of the class described, of a main shaft, a shear blade carried by and radial to said shaft, a conveyer shaft driven from said main shaft, a countershaft driven from said conveyer shaft, a feed shaft driven from said countershaft, a bed-knife at right-angles to said main shaft and parallel with said feed shaft, a feed box having its discharge end over said bed-knife, a feed-roll in said box, and a shaft for said roll driven from said feed shaft.

10. The combination, in a machine of the class described, of a bed-knife, and means to feed stock to said knife, of a shaft at right-angles to said knife, a slotted carrier secured to said shaft, a bar set in the slot in said carrier and extending beyond opposite edges thereof, a plate secured to said carrier over said bar, and shear blades secured to said bar in operative relation to said bed-knife.

CHARLES W. GRIFFIN.

Witnesses:
HENRY W. GRIFFIN,
WARREN M. BROTZMAN.